Figure 1:
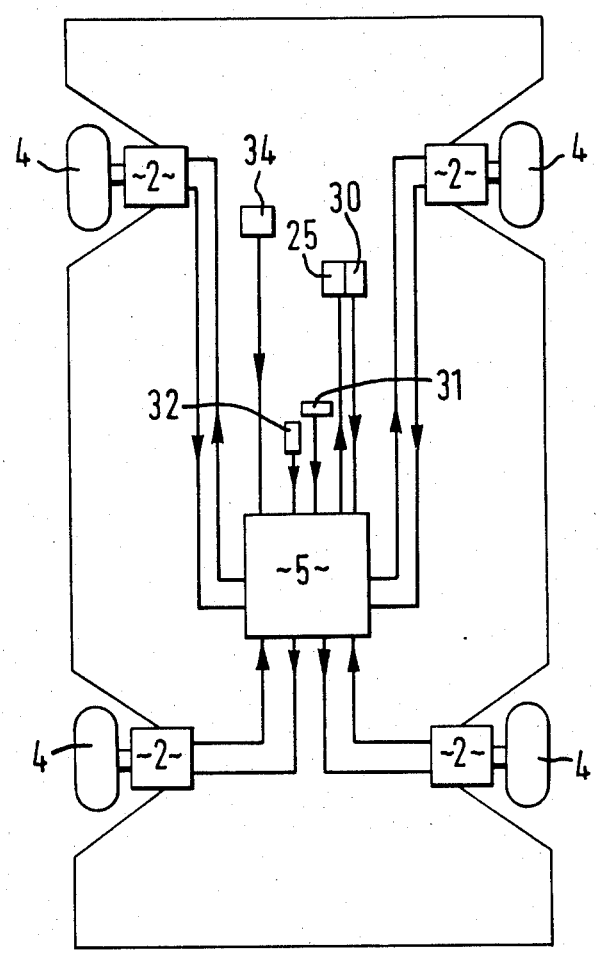

United States Patent [19]

Williams et al.

[11] Patent Number: 4,625,993
[45] Date of Patent: Dec. 2, 1986

[54] VEHICLE SUSPENSION SYSTEM

[75] Inventors: David A. Williams, Cranfield; Peter G. Wright, Norwich, both of United Kingdom

[73] Assignee: Group Lotus Public Limited Company, Norwich, England

[21] Appl. No.: 653,216

[22] PCT Filed: Jan. 20, 1984

[86] PCT No.: PCT/GB84/00014

§ 371 Date: Sep. 20, 1984

§ 102(e) Date: Sep. 20, 1984

[87] PCT Pub. No.: WO84/02886

PCT Pub. Date: Aug. 2, 1984

[30] Foreign Application Priority Data

Jan. 21, 1983 [GB] United Kingdom ............... 8301741

[51] Int. Cl.⁴ ............................................. B60G 11/26
[52] U.S. Cl. ................................... 280/707; 280/611; 280/DIG. 1
[58] Field of Search ......... 200/6 R, 6 H, 707, DIG. 1

[56] References Cited

U.S. PATENT DOCUMENTS

| | | | |
|---|---|---|---|
| 3,124,368 | 3/1964 | Corley et al. | 280/6 R |
| 3,625,539 | 12/1971 | Crouch et al. | 280/112 R |
| 3,770,292 | 11/1973 | Palazzetti | 280/6 H |
| 3,836,161 | 9/1974 | Buhl | 280/6 H |
| 3,881,736 | 5/1975 | Wilfert | 280/6.1 |
| 4,054,295 | 10/1977 | Elliott | 280/707 |
| 4,065,154 | 12/1977 | Glaze I | 280/707 |
| 4,185,845 | 1/1980 | Misch et al. | 280/6 H |
| 4,333,668 | 6/1982 | Hendrickson et al. | 280/703 |
| 4,371,191 | 2/1983 | Goldberg et al. | 280/707 |

FOREIGN PATENT DOCUMENTS

| | | |
|---|---|---|
| 1176981 | 4/1959 | France . |
| 2251451 | 6/1975 | France . |
| 2362017 | 3/1978 | France . |
| 1334971 | 10/1973 | United Kingdom . |
| 2003255 | 3/1979 | United Kingdom . |
| 2068308 | 8/1981 | United Kingdom . |
| 1604416 | 12/1981 | United Kingdom . |

Primary Examiner—John J. Love
Assistant Examiner—Kenneth R. Rice
Attorney, Agent, or Firm—Young & Thompson

[57] ABSTRACT

A vehicle suspension system comprises suspension units (2) with double acting hydraulic actuators (12) for carrying the road wheels (4). Signals from transducers sensing actuator load and actuator piston position (14,15) are used in a control system (5) to generate signals representing forces corresponding to heave, pitch, roll and warp modes of vehicle movement and control signals are generated for supply to servo-valves (18) associated with the actuators to obtain desired vehicle attitude. The control signals can be modified by signals representing vehicle speed and lateral and longitudinal acceleration and under selective control of the driver.

20 Claims, 9 Drawing Figures

VEHICLE SUSPENSION SYSTEM

DESCRIPTION

The invention relates to vehicle suspension systems.

The ride qualities of conventional road vehicles cannot be optimised because the springs and dampers of the suspension cannot be arranged to deal with all the various modes of movement of the vehicle body. Moreover, current development of road passenger vehicles tends towards weight reduction and improved aerodynamic efficiency, primarily in order to achieve reduced fuel consumption. However, the loads to be carried are not reduced. The suspension systems of such vehicles are consequently required to accommodate an effectively widening range of load conditions. It is consequently necessary to select spring rates so as to obtain what is necessarily a compromise between desired ride characteristics and desired control of vehicle attitude under various load and manoeuvre conditions.

The invention is accordingly concerned with an improved vehicle suspension system permitting control of the ride of the vehicle and its attitude to be achieved substantially independently. Preferably, the system is capable of keeping a vehicle substantially stable in all planes of movement, irrespective of external forces.

The invention accordingly provides a vehicle suspension system comprising wheel suspension devices the displacement of which can be varied, and means responsive to the loading of the suspension devices to feed back to the devices electric signals effecting a predetermined displacement.

The invention also provides an active vehicle suspension system comprising an hydraulic actuator for supporting each wheel, means for sensing the position of the actuator piston, and means for effecting positive adjustment of the piston position.

The invention also provides an active vehicle suspension system for a road vehicle, the system comprising a hydraulic actuator associated with each road wheel, means responsive to forces acting on the actuator pistons and to the displacements of the actuator pistons to generate signals representative of forces corresponding to at least one of the heave pitch roll and warp modes of vehicle movement, and a control system for treating the signals to obtain control signals for effecting desired piston displacement.

The hydraulic actuators or rams employed in the active suspension systems of the invention may replace or may be used in parallel with passive spring and damper type suspension elements as are solely employed in conventional systems. For example, the vehicle suspension springs may be retained to support the deadweight of the vehicle, so that the hydraulic actuators are effective only in respect of dynamic movements during driving of the vehicle. The actuators are preferably fitted concentrically within the springs. Each actuator is associated with a first transducer, for example, a load cell, and a second transducer, for example a linear variable displacement transformer, for sensing load and piston position or displacement respectively, and with means, such as an electrically driven servo control valve, for moving the piston to a position dependent on the transducer outputs. The command signals supplied to the control valves are generated by a control system comprising a digital, analogue or hybrid computer, the programming of which can if desired be selectively variable by the vehicle driver.

The transducer signals representative of the loads reacted by the actuators and the instantaneous load values can be employed to generate signals corresponding to the three rigid body modes, heave, pitch and roll as well as the warp mode. The signals are scaled by the control system computer to provide signals corresponding to desired generalised displacements in the modes, which provide output signals to the servo valves to effect appropriate piston displacement.

The outputs of the eight transducers, two associated with the suspension of each of four road wheels, can thus be fed into a computer which implements a control law based on the following considerations.

In a second order system driven by motion y of the attachment point and an external force acting upon mass m:

$$(D \cdot (D \cdot m + x) + k) \cdot X = m \cdot DDy + f(t)$$

where x is the motion of the mass relative to the base
f is the external force acting upon the mass and
D is the differential Operator d/dt Such a system can be simulated by an hydraulic actuator of the suspension system supporting a mass M by using measurements of displacement X, base acceleration y and force F reacted by the actuator by demanding a displacement:

$$Xd = F/k - (M-m) \cdot DDy/k - c \cdot (DX)/k + (M-m) \cdot (D \cdot DX)/k$$

If the servo loop gain is sufficiently high, then Xd will tend to X, and X will, in turn, tend to χ, thereby simulating the required response characteristics. The simulation problem can be simplified somewhat if the actual mass M is equal to the simulated mass m, so that the displacement demand reduces to:

$$Xd = D/k = c \cdot (DX)/k$$

This principle is applied to the active suspension system of the invention by describing the rigid body normal modes in terms of the measured actuator displacements and derived velocities. If X1, X2 etc. are the actuator displacements, and F1, F2 are the loads reacted by actuators, then:

Heave Displacement $H = X1 + X2 + X3 + X4$

Heave Load $= F1 + F2 + F3 + F4$

Pitch Displacement $P = ((X1 + X2) - (X3 + X4))/L$

Pitch Torque $= (F1 + F2) \cdot xf = (F3 + F4) \cdot (L - xf)$

Roll Displacement
$R = (X1 - X2) \cdot xf/(yf \cdot L) + (X3 - X4) \cdot (L - xf)/yr \cdot L)$ Roll Torque $= (F1 - F2) \cdot yf/2 + (F3 - F4) \cdot yr/2$ where
L is the vehicle wheel base
xf is the distance between the centre of gravity and the front "axle"
yf is the front wheel track and
yr is the rear wheel track These relationships allow actual measurements to be translated into mode displacements and generalised forces for each of the rigid body modes. Demanded modal displacements can be calculated from these, and the above procedure reversed to derive demanded actuator displacements. Thus:

$$Xd1 = Hd + Pd \cdot xf + Rd \cdot yf/2$$

$$Xd2 = Hd + Pd \cdot xf - Rd \cdot yf/2$$

$$Xd3 = Hd - Pd \cdot (L - xf) + Rd \cdot yr/2$$

$$Xd4 = Hd - Pd \cdot (L - xf) - Rd \cdot yr/2$$

The vehicle need not be fitted with anti-roll bars, as front and rear anti-roll bars can be simulated by factoring yf and yr in the roll force calculation only.

The control system represented by the computer preferably provides for modal damping, and the generalised displacements may be modified to control vehicle attitude during acceleration, braking and cornering in response to inputs provided by accelerometers located close to the centre of gravity of the vehicle. The accelerometer inputs are supplied to the control system computer so that the effective roll and dive experienced during cornering and braking can be modified independently by adding or substracting scaled centre of gravity acceleration measurements to calculated roll and pitch torques.

The attitude of the vehicle under varying external loads can be controlled by blocking steady state values of the measured loads.

Tyre damping can be effected by input of signals representing wheel hub velocity to modify individually the measured forces. Thus transducers providing signals representing wheel hub accelerations can be provided and these signals are fed into the control system. After scaling, the signals are used to modify the effective unsprung mass by addition of the wheel hub accelerations to the measured forces or by subtraction of the accelerators from these forces.

Moreover, ground clearance can be adjusted by adding or subtracting an offset representing for example scaled dynamic pressure to the calculated heave force.

Also, there could if desired be added to the heave demand a term derived from the integral of the error between the actual displacement and a required displacement.

Actuator displacement is preferably "soft limited" by passing the linear demand through a non-linear window, roughly simulating the bump stops of a conventional suspension system.

The invention will be understood to provide simple and effective means for optimising or selecting ride and handling characteristics of vehicles, in particular, road vehicles, by permitting vehicle ride and attitude to be controlled independently. Different suspension characteristics can be brought into effect according to the loading of the vehicle and/or the manoeuvres it is performing. The suspension characteristics can if desired be quickly changed at will, without mechanical alterations.

Figure 3:
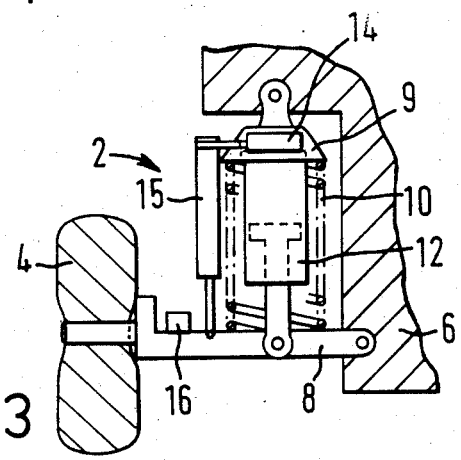
Figure 2:
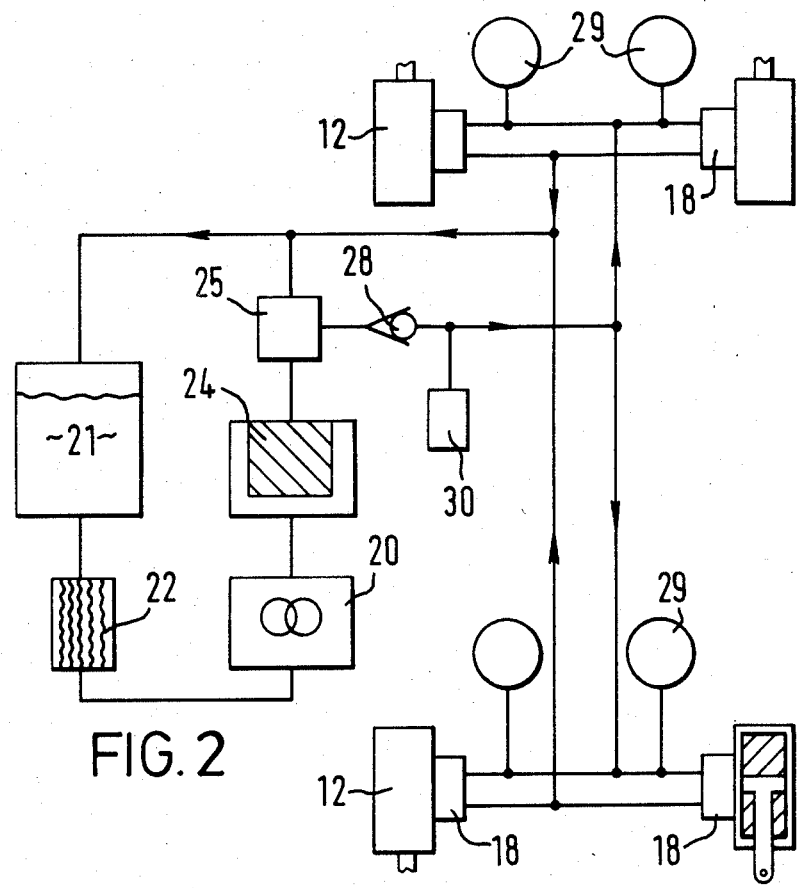
Figure 4:
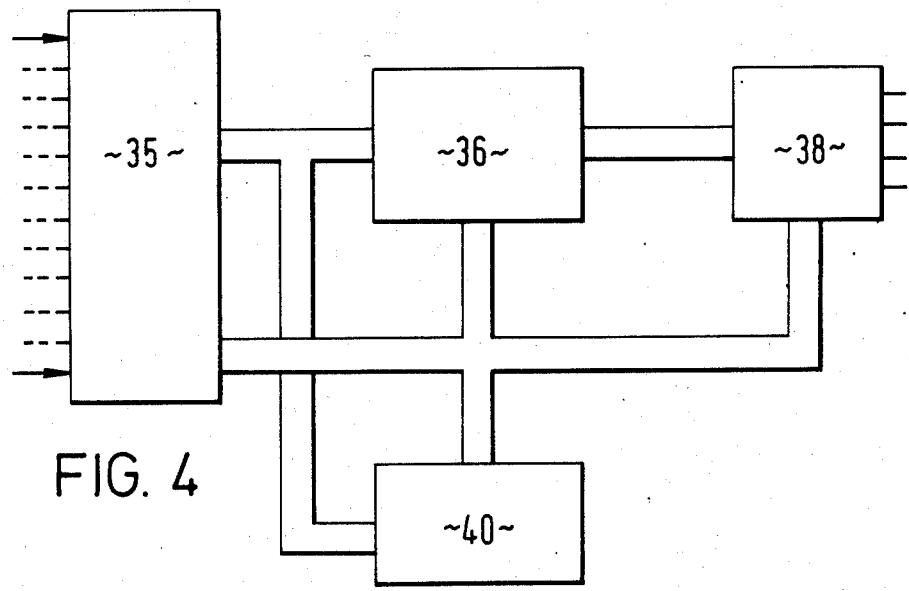
Figure 5:
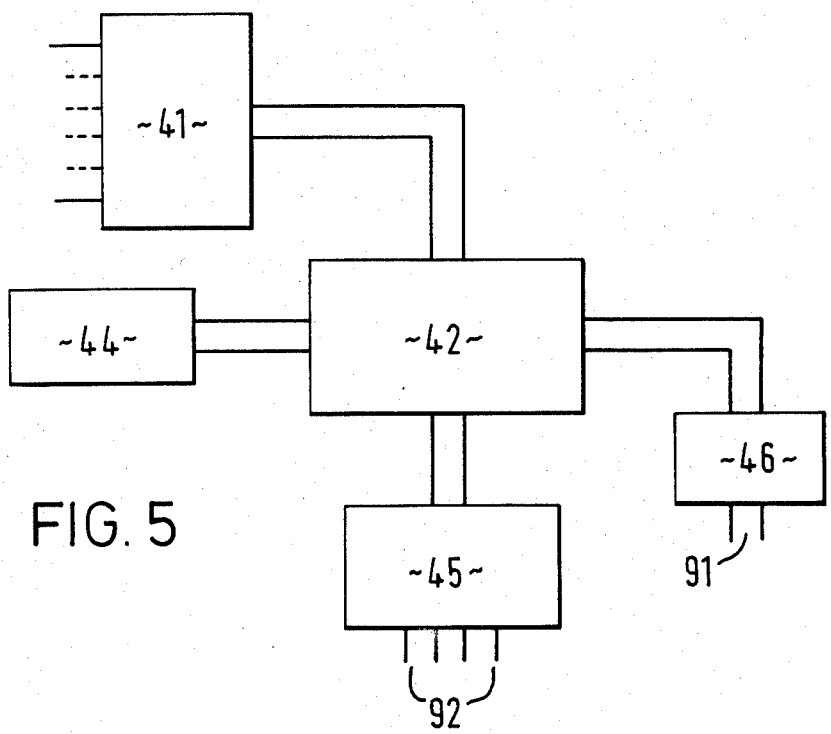
Figure 6:
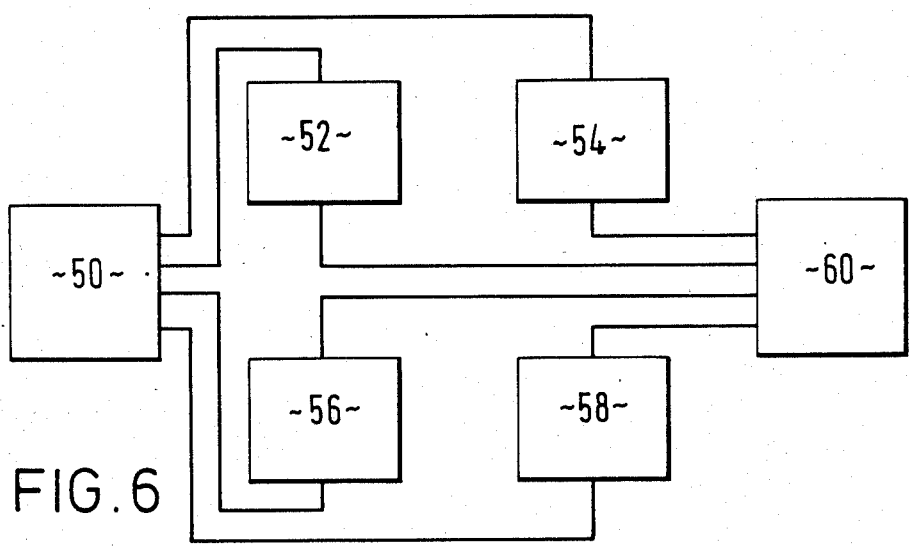
Figure 7:
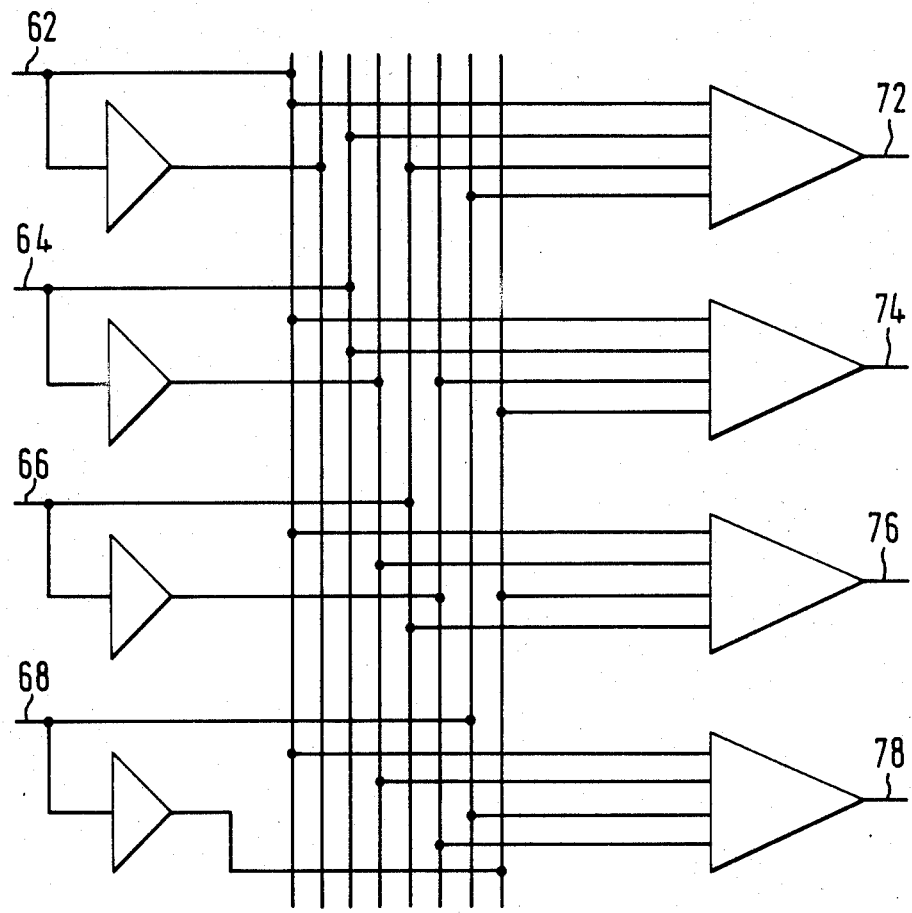
Figure 8:
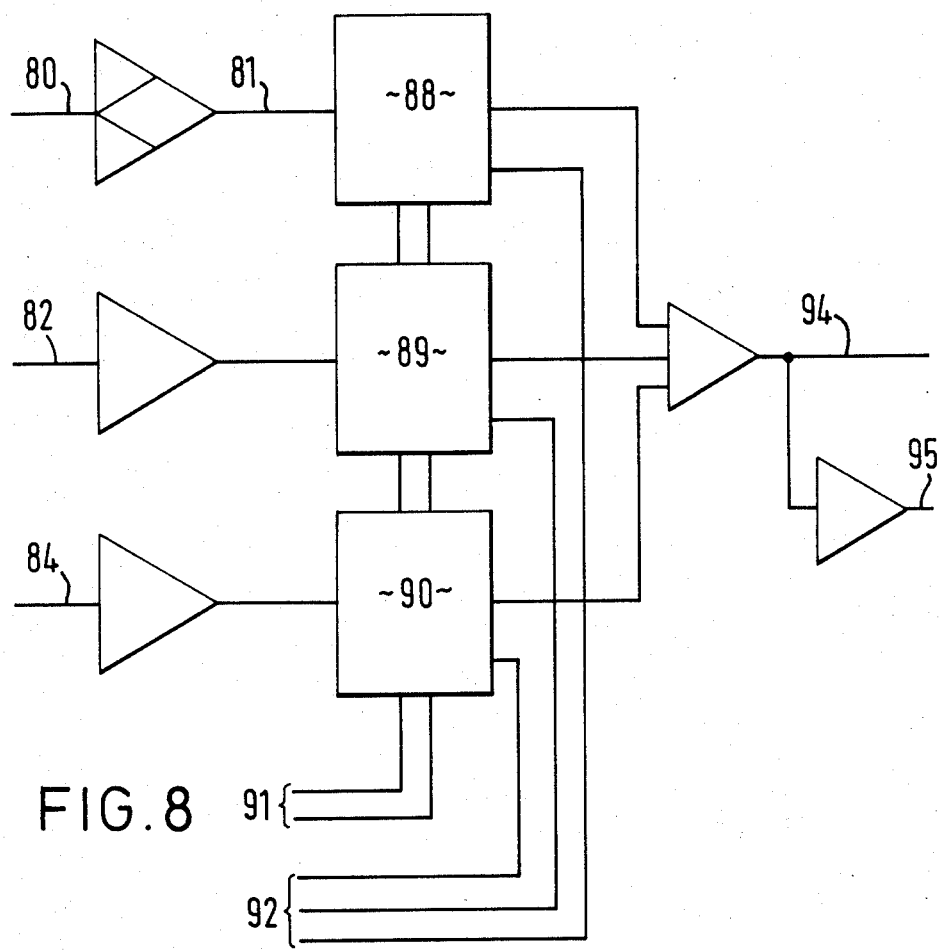
Figure 9:
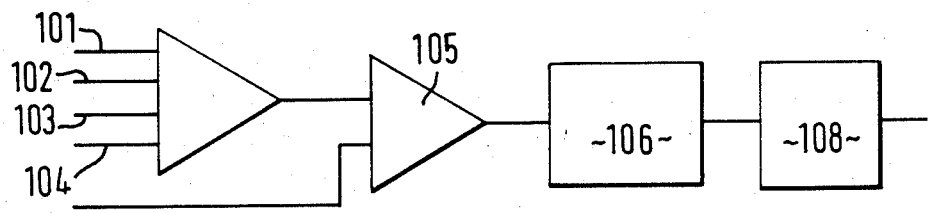

An embodiment of the invention is described below, by way of illustration, with reference to the accompanying drawings, in which:

FIG. 1 is a schematic plan view of a four-wheeled road vehicle incorporating an active suspension system in accordance with the invention;

FIG. 2 schematically illustrates an hydraulic circuit included in the suspension system;

FIG. 3 is a schematic fragmentary front view of a suspension arrangement for a road wheel of the vehicle of FIG. 1;

FIG. 4 schematically illustrates in block diagram form an electronic control system included in the suspension system;

FIG. 5 schematically illustrates in block diagram form a computer included in the control system of FIG. 4;

FIG. 6 schematically illustrates in block diagram form a processor included in the control computer of FIG. 5;

FIG. 7 schematically illustrates a measurement transformation unit included in the processor of FIG. 6;

FIG. 8 schematically illustrates in block diagram form a typical displacement computer incorporated in the processor of FIG. 6; and FIG. 9 schematically illustrates in block diagram form a typical displacement demand transformation and screw control unit included in the processor of FIG. 6.

In the accompanying drawings, there is schematically illustrated a road vehicle, which may be for example a passenger road vehicle which incorporates an active suspension system in accordance with the present invention, but which need not in other respects differ from a conventional vehicle of this kind. The suspension system comprises a hydraulic suspension unit 2 for each of the road wheels, each unit having transducers for supplying electric signals to a control system 5 and an electro-hydraulic servo control valve for effecting piston displacement in response to output signals from the control system. Anti-roll bars are not fitted.

Each suspension unit 2 carries the associated road wheel 4 from the vehicle chassis or body 6 by a pivoted suspension arm 8. Between the arm 8 and an upper end fitting 9 pivoted to the body 6 is a compression spring 10 and a double acting hydraulic actuator 12 received within the spring, the actuator piston being pivoted to the arm, so that the actuator and spring act in parallel between the vehicle body 6 and the wheel 4.

The load experienced by the actuator 12 is measured by a load cell 14 accommodated in the end fitting 9, and the piston position or displacement is measured by a linear variable displacement transformer 15.

In addition, the suspension unit 2 includes a transducer, constituted by an accelerometer 16 mounted on the arm 8, providing an output dependent on wheel hub acceleration.

The position of the piston of each hydraulic actuator 2, and thus actuator length, can be adjusted by control of hydraulic fluid supplied to the actuator through an electro-hydraulic fluid supplied to the actuator through an electro-hydraulic servo control valve 18 from a hydraulic circuit shown in FIG. 2. The circuit comprises a multiple piston pump 20 driven from the vehicle engine which receives the fluid from a reservoir 21 through a cooler 22 and supplies it at a pressure of about 3,000 psi through a filter 24 to a fluid control valve 25 either through a non-return valve 28 to the actuators, each of which is associated with an accumulator 29 to accommodate peak flow demand or on a by-pass path back to the reservoir. Output pressure is sensed by a transducer 30 of which the output signal is supplied to a computer of the control system 5 which provides an output for operation of the control valve 25.

The electronic control system 5 receives, in addition to inputs from the transducers 14,15,16 associated with the suspension units 2, inputs from accelerometers 31,32 located at the nominal centre of gravity of the vehicle and responsive respectively to the longitudinal and lateral acceleration of the vehicle, together with an input representing the forward speed of the vehicle, which can be derived from a source 34 for example from the speedometer. Finally, the control system 5 receives a hydraulic supply pressure signal from transducer 30, for control of the hydraulic system only.

As schematically shown in FIG. 4, the control system 5 comprises a signal conditioning unit 35 which receives the twelve analog signals generated by the transducers 14,15,16 associated with the suspension units 2 and the four further signals from the vehicle transducers 29,31,32 and 34, and conditions them for treatment by an analog processor 36 shown in more detail in FIG. 6. The processor 36 provides outputs to a servo drive unit 38 which in turn supplies outputs to the servo valves 18 of the actuators 12 to cause adjustment of actuator piston position to achieve a desired vehicle attitude.

The control system 5 is controlled by a digital system controller 40, which as shown in FIG. 5, comprises an analog to digital converter 41 receiving the transducer outputs after treatment by the signal conditioning unit 35. The digital output of the converter 41 is supplied to a microprocessor 42 associated with a program store 44 and providing outputs to a device sheet 45 and to an output latch unit 46 controlling the gain demand. The units 45 and 46 provide outputs to computer units of the processor 36 as described below. The microprocessor 42 also controls the hydraulic system pressure and the latch unit 46 includes an output to the control valve 25.

FIG. 6 shows the processor 36 of the control system in more detail. The processor comprises a measurement transformation unit 50, receiving the conditioned analog signals from the conditioning unit 35 and deriving from the load and displacement output signals, which are fed to respective heave pitch roll and warp displacement computers 52,54,56 and 58. The circuit of the measurement transformation unit appears from FIG. 7, and a block diagram typical of one of the computers 52,54,56 and 58 is shown in FIG. 8. The outputs of the computers 52,54,56,58 are conveyed to a displacement demand transformation and signal control unit 60, of which further particulars are shown in FIG. 9.

Referring to the measurement transformation unit of FIG. 7, the transducer outputs from the four road wheels are applied to respective lines 62,64,66,68 and signals representing displacement in the heave, pitch, roll and warp mode are derived on output lines 72,74,76,78. Each of the four displacement computers 52,54,56,58 receives as inputs a dynamic displacement signal on line 80, from which is derived a dynamic velocity signal on line 81, a force signal on line 82, and a static displacement demand signal on line 84. These signals are modified, in respective units 88,89, 90 incorporating digital analog converters, by gain and device select signals conveyed respectively on lines 91 and 92 from the system control computer 40. The unit outputs are combined for generation of positive and negative displacement demand signals output on lines 94 and 95

The outputs of the four displacement computers are supplied to the displacement demand transformation and servo control unit 60 of the processor 36. FIG. 9 shows one of the four parts of this unit which part provides a control output for the servovalve 18 of a respective one of the actuators 12. Heave, pitch, roll and warp demand signals on lines 101, 102, 103 and 104 are combined to obtain a signal representing unit demand, which is compared in comparator 105 with a signal representing suspension unit displacement to produce an error signal. The error signal is filtered to eliminate any signal elements which might have spurious control effects by means of filter unit 106. The filter unit output is applied to develop a current for driving the appropriate servo control valve in the current driver unit 108.

It will be appreciated that the processor 36 is configured so as to transform the actuator measurements into mode displacements and generalized forces for the rigid body modes in accordance with the relationship described in the introduction and likewise to calculate the modal displacements and demanded actuator displacements. Also, the signals dependent on the vehicle speed and acceleration, and on wheel hub acceleration are applied in the processor to modify the demanded displacements as described. The "soft limit" modification to simulate bump stops can be applied to the control system output by the unit 108. The system controller 40 can include means for imposing adaptive control of the vehicle attitude for example to set the vehicle lower to the ground at higher speeds, or at a higher level under a given payload, or in response to wind forces and stresses due to towing.

It will be evident that the invention can be embodied in a variety of ways differing from the embodiments specifically described, within the scope of the invention as defined by the following claims. The control system could for example operate wholly digitally. Although described primarily in connection with road vehicles, the invention is not so limited in its applications.

We claim:

1. A suspension system for a road vehicle, said road vehicle comprising a vehicle body and road wheels supporting said body by way of said suspension system, wherein:

said suspension system comprises a double acting hydraulic actuator extending between said vehicle body and each of said road wheels, a pressure fluid circuit into which said hydraulic actuators are connected, transducer means operatively associated with each of said hydraulic actuators, each transducer means being adapted to provide outputs representative of the load reacted by the associated hydraulic actuator and the displacement thereof, electro-hydraulic servo valves, each servo valve being operative to adjust a respective one of said hydraulic actuators, and circuit means responsive to said outputs of said transducer means to generate signals corresponding to a plurality of the heave pitch and roll modes of movement of said vehicle body, to generate further signals corresponding to predetermined generalized displacements in said plurality of modes of vehicle body movement, and to derive from said further signals control signals for said servo valves, whereby said hydraulic actuators are adjusted so as to maintain a predetermined attitude of said vehicle body.

2. The system of claim 1 further comprising means permitting selective variation of the operation of said circuit means by an operator of said vehicle.

3. The system of claim 1 further comprising means for controlling the attitude of said vehicle body under varying external loads.

4. The system of claim 1 further comprising passive spring and damper suspension elements, each element being in parallel with a respective one of said hydraulic actuators.

5. The system of claim 1 wherein said pressure fluid circuit includes accumulators each associated with a respective one of said hydraulic actuators to accommodate peak flow demand.

6. The system of claim 1 further comprising first and second accelerometers responsive respectively to longitudinal and lateral accelerations of said vehicle body and adapted to supply to said circuit means signals for modifying said generalized displacements.

7. The system of claim 1 wherein said circuit means is adapted to simulate the function of anti-roll bars.

8. A suspension system for a vehicle comprising a vehicle body supported on wheels, the system comprising:
a pressure fluid circuit having a source of pressure fluid, double-acting hydraulic actuators each having a piston movable in a cylinder and each being operative between the vehicle body and a respective one of said wheels,
electro-hydraulic servo valves, each valve connecting a respective one of said hydraulic actuators into said pressure fluid circuit,
transducer means associated with each hydraulic actuator and having electrical outputs dependent on actuator loading and actuator piston displacement,
circuit means responsive to said transducer outputs to generate signals representative of forces corresponding to at least one of the heave pitch roll and warp modes of movement of said vehicle body and to treat said signals so as to obtain control signals for said servo valves whereby said hydraulic actuators are actuated to maintain said vehicle body in a predetermined attitude.

9. The system of claim 8 wherein said circuit means is adapted to transform said transducer output into mode displacement signals and generalized force signals for said at least one mode, to compute therefrom modal displacement demand signals, and to derive therefrom said control signals.

10. The system of claim 8 wherein said pressure fluid circuit comprises a servo control valve between said source and said hydraulic actuators and a transducer providing an electric output dependent on fluid pressure between said control valve and said hydraulic actuators, and wherein said circuit means is responsive to said transducer output to provide a control signal to said control valve.

11. The system of claim 8 further comprising spring suspension elements associated with said hydraulic actuators, said spring suspension elements being adapted to support the weight of said vehicle body whereby said hydraulic actuators operate substantially only in respect of dynamic movements of said vehicle body.

12. The system of claim 8 further comprising means in said circuit means for limiting actuator displacement, whereby said system simulates conventional suspension system bump stops.

13. The system of claim 8 wherein said circuit means is adapted to generate, in response to said transducer outputs, signals representing vehicle body displacement in said at least one mode, demand signals, error signals by comparison of said demand signals with said transducer displacement outputs, and said control signals in response to said error signals.

14. A road vehicle comprising:
a vehicle body,
road wheels supporting said vehicle body,
double-acting hydraulic actuators, each hydraulic actuator being operative between a respective one of said road wheels and said vehicle body to adjust the spacing therebetween,
a source of pressure fluid,
an electro-hydraulic servo valve associated with each hydraulic actuator for controlling flow of the pressure fluid between said source thereof and said associated hydraulic actuator,
fluid pressure accumulator means connected between each of said hydraulic actuators and said fluid pressure source,
a first and second transducer means associated with each of said hydraulic actuators for providing output signals dependent respectively on the forces acting on the hydraulic actuator piston and on the displacement thereof within the actuator, and
control means receiving said transducer means output signals and providing output control signals controlling said electro-hydraulic servo valves to thereby maintain said vehicle body in a predetermined attitude, said control means comprising:
a signal conditioning unit have input means and output means said input means being connected to said transducer means to receive said output signals thereof,
a measurement transformation unit having input means connected to said signal conditioning unit output means, to receive said output signals after conditioning by said unit and output means,
said measurement transformation unit providing at said output means thereof signals representing displacement in at least two of the heave pitch roll and warp modes of movement of said vehicle body,
computer means having input means and output means, said input means thereof being connected to said measurement transformation unit output means, and said computer means being adapted to provide displacement and displacement demand signals at said output means thereof,
a comparator having input means and output means, said input means thereof receiving said displacement and displacement demand signals from said computer means output means and said comparator being adapted to provide error signals at said output means thereof, and
a servo drive means having input means and output means, said input means being connected to comparator output means and said servo drive output means being connected to said servo control valves.

15. The vehicle of claim 14 comprising means whereby the ground clearance of said vehicle can be adjusted.

16. The vehicle of claim 14 further comprising transducer means providing signals representing hub velocities of said road wheels, said circuit means being responsive to said transducer means signals to effect tyre damping of said road wheels.

17. The vehicle of claim 14 wherein said control means further comprises a controller, said controller comprising input means connected to said signal conditioning unit output means to receive said transducer means output after conditioning by said unit, a processor, and a program store in communication with said processor.

18. The vehicle of claim 14 wherein said first transducer comprises a load cell.

19. The vehicle of claim 14 wherein said second transducer comprises a linear variable displacement transformer.

20. The vehicle of claim 14 further comprising suspension springs, each of said hydraulic actuators being concentrically received within a respective one of said suspension springs.

* * * * *